United States Patent [19]
Rothchild

[11] 4,118,873
[45] Oct. 10, 1978

[54] METHOD AND APPARATUS FOR INERTING THE ATMOSPHERE ABOVE A MOVING PRODUCT SURFACE
[75] Inventor: Ronald D. Rothchild, South Orange, N.J.
[73] Assignee: Airco, Inc., Montvale, N.J.
[21] Appl. No.: 749,951
[22] Filed: Dec. 13, 1976
[51] Int. Cl.² .................................................. B01K 5/00
[52] U.S. Cl. ............................................ 34/36; 34/4; 34/34; 34/41; 204/159.23; 250/492 R
[58] Field of Search .................... 34/23, 33, 34, 36, 4, 34/41, 155, 160; 250/453, 432, 455, 492, 1; 117/93, 93.3, 93.31; 204/159.11, 159.23

[56] References Cited
U.S. PATENT DOCUMENTS

| 3,654,459 | 4/1972 | Coleman | 250/453 |
| 3,676,673 | 7/1972 | Coleman | 250/453 |
| 3,936,950 | 2/1976 | Trove | 34/4 |

Primary Examiner—John J. Camby
Assistant Examiner—Larry I. Schwartz
Attorney, Agent, or Firm—David L. Rae; Larry R. Cassett; Edmund W. Bopp

[57] ABSTRACT

A method and apparatus for inerting the atmosphere adjacent a moving product surface such as a resin bearing web material includes passing the product through a device having entrance and exit tunnels and a treatment chamber therebetween at speeds up to 1,000 ft. per minute or greater. An inert gas flow is introduced into the entrance tunnel at a velocity relative to the velocity of the moving product surface such that a turbulent condition is established in the boundary layer of air dragged into the entrance tunnel by the moving product. Turbulence in the boundary layer promotes the rapid diffusion of atmospheric oxygen upwardly away from the moving product surface. The inert gas flow is of a magnitude sufficient to maintain oxygen concentration at the tunnel entrance at less than 20.8% thereby enabling such diffusion of oxygen. For slowly moving product surfaces, a high velocity cross flow inert gas stream is provided to establish a resultant relative velocity capable of generating the requisite turbulence.

7 Claims, 13 Drawing Figures

U.S. Patent    Oct. 10, 1978    Sheet 1 of 3    4,118,873
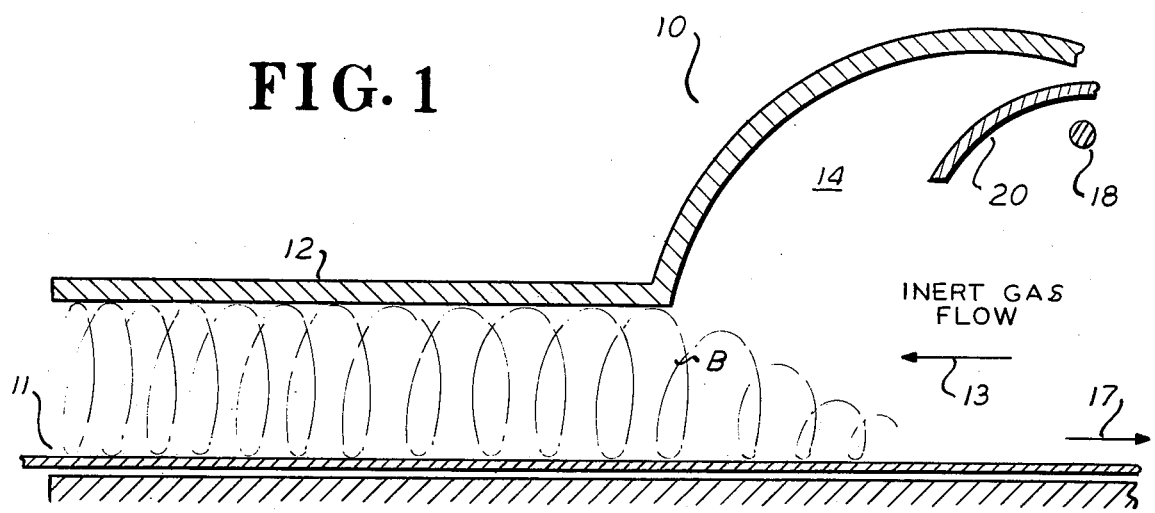
FIG. 1
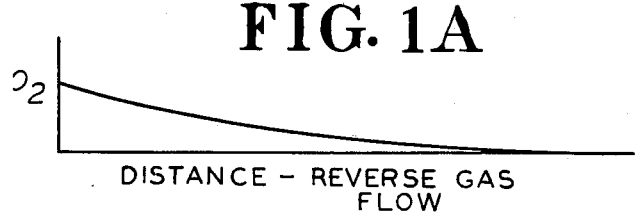
FIG. 1A
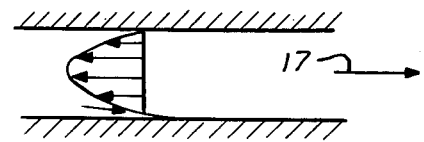
FIG. 1C
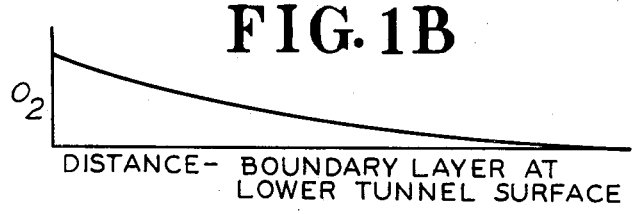
FIG. 1B
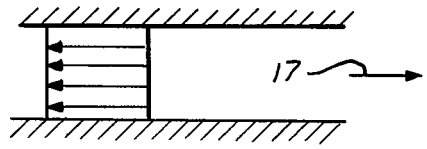
FIG. 1D
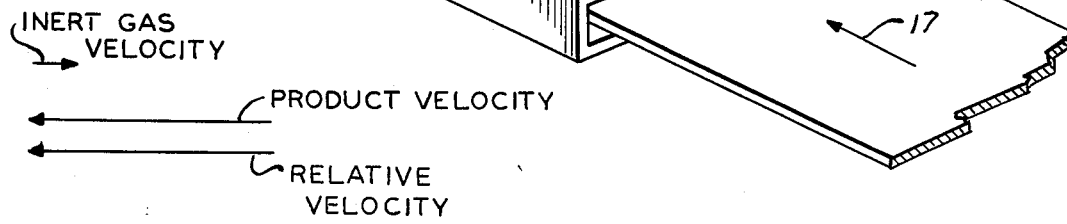
FIG. 2A
FIG. 2B

METHOD AND APPARATUS FOR INERTING THE ATMOSPHERE ABOVE A MOVING PRODUCT SURFACE

BACKGROUND OF THE INVENTION

The present invention relates to methods and apparatus for inerting the atmosphere adjacent moving product surfaces and more particularly, to methods for curing resin bearing web material passed through a treatment chamber at sppeds of up to 1,000 ft. per minute and greater.

In various industrial applications, it has been found necessary to inert the atmosphere above product surfaces passing through treatment devices. For example, in processes for curing resin materials such as coatings or inks on a moving product surface such as a web material by exposure of the resin materials to ultraviolet radiation, electron beams, or other radiation, it has been found necessary to inert the atmosphere above such web and resin material during curing. The reason for requiring such inerting of such atmosphere when utilizing ultraviolet radiation is that the effectiveness of sensitizers in the resin is substantially reduced in the presence of oxygen. Thus, inerting of an atmosphere above a resin bearing material during curing allows for an efficient cure reaction in that less sensitizer is necessary because less is lost by reaction with atmospheric oxygen and accordingly, extra radiant energy is not required to compensate for otherwise lost sensitizer. In addition to the foregoing, it is known that utilization of an inert atmosphere above a resin bearing material during curing will result in improved surface finishes as the formation of resin-oxide bonds is avoided and better cross linking of polymers will result. Similarly, oxygen also interferes with polymerization of resins during curing with electron beam radiation notwithstanding the absence of sensitizers. Furthermore, inerting of such atmospheres enables a wider selection of prepolymer materials to be utilized.

In a typical curing apparatus, a resin bearing web material is passed through an entrance tunnel into a chamber in which it is exposed to necessary radiation and then emerges through an exit tunnel or the like. The product passed into the tunnel will carry in air simply due to skin or boundary layer drag phenomenon. In the event the product is discrete, such as panels of a product with a finite thickness of 0.5 inch or so, the air dragged into the entrance tunnel is trapped due to the configuration of the leading edge of the panel. With a continuous web which may be coated with a particular material being passed into the entrance tunnel of such a curing apparatus, air is carried into such tunnel by a skin or boundary layer effect only. Therefore, in order to avoid excessive quantities of air from being dragged into a curing or other similar apparatus, the atmosphere of the radiation chamber is inerted and air is commonly swept from the entrance tunnel.

Typically, an inert gas is introduced into tunnels and/or treatment chambers and is caused to flow in a direction countercurrent to the direction of movement of the product surface. Attempts to increase the throughput of such treatment devices by increasing the speed at which the product is passed therethrough have not proven effective because the requisite economy in terms of inert gas can only be attained from reliance upon laminar boundary layer conditions which, in turn, are achieved at low product speeds. It has been found that in prior art inerting processes, high product speeds which do not result in laminar boundary layer conditions have required excessive inert gas consumptions. Accordingly, the efficiency of such prior art inerting systems has been limited and, in practice, the speeds at which many moving products can be treated has been likewise limited by the inability to economically inert the atmosphere thereabove at relatively high product speeds.

Apparatus for curing resin bearing web material in inert atmospheres at limited rates is illustrated in U.S. Pat. Nos. 3,807,052 and 3,936,950. In these systems, an inert gas flow is introduced into the entrance tunnel of a curing apparatus at an angle of at least 45° with respect to the web material and in such a manner as to assure a non-turbulent, non-mixing inert gas flow. The stated effect of this flow is to strip, or physically displace, atmospheric air from the surface of the web material although as indicated in these references, the maximum speed at which such materials can be cured is 1,000 ft. per minute. In general, actual operating speeds are approximately half of such maximum speeds. This technique for inerting atmospheres in curing apparatus requires that the inert gas stream have a velocity countercurrent to web velocity and a magnitude greater than the velocity of the moving web material. This, results in a relatively large quantity of inert gas being swept out the entrance of the curing apparatus and hence compromises the economics of the entire curing operation. U.S. Pat. No. 3,654,459 discloses apparatus for curing resin bearing web material in inert atmosphere wherein a non-turbulent condition is established in the introduced an inert gas. Similar systems are illustrated in U.S. Pat. Nos. 3,676,673 and 3,790,801 and in all of such systems it is noted that the maximum speed at which the web material may be translated and at which resin coatings will be cured is limited to approximately 150–200 ft. per minute. A further curing apparatus wherein resin coatings are cured in inert atmospheres is illustrated in U.S. Pat. No. 2,887,584. However, in none of the foregoing patents is there any structure illustrated or process described which permits curing product surface resin coatings or inks on web materials being translated at speeds of 1000 ft. per minute or greater. Accordingly, the prior art described above exhibits a clear need for apparatus in which moving product surfaces such as resin bearing web materials, can be treated, i.e., cured at speeds of 1,000 ft. per minute and greater in an economical manner.

OBJECTS OF THE INVENTION

It is an object of the present invention to provide an improved methods and apparatus for inerting atmospheres adjacent moving product surfaces.

It is a further object of the present invention to provide improved methods and apparatus for effectively inerting atmospheres adjacent product surfaces translated at product speeds of 1,000 ft. per minute and greater.

It is yet another object of the present invention to provide improved methods and apparatus for inerting atmospheres adjacent product surfaces translated at high speeds yet with an economic and efficient utilization of inert gas.

It is yet a further object of the present invention to provide improved methods and apparatus for curing resin bearing web material in inert atmospheres at relatively high web speeds without requiring excessive tunnel lengths to enable successful inerting of atmospheres above the web material in tunnels and in a radiation chamber.

It is yet another object of the present invention to provide improved methods and apparatus for treating a moving product surface in an inert atmosphere wherein atmospheric oxygen in a boundary layer adjacent the surface is removed from the product surface by diffusion.

Other objects of the present invention will become apparent from the detailed description of an exemplary embodiment thereof which follows and the novel features of the present invention will be particularly pointed out in conjunction with the claims appended thereto.

SUMMARY

In accordance with the present invention, a method of inerting the atmosphere above a product surface moving through a tunnel or the like comprises introducing an inert gas flow into the tunnel at a velocity relative to the velocity of the moving product such that oxygen concentration immediately inside the tunnel entrance is less than 20.8% and a turbulent flow is created in the boundary layer adjacent the moving product surface such that atmospheric oxygen dragged into the tunnel by the product surface boundary layer is rapidly diffused away from the product surface thereby enabling inerting of such atmospheres at substantially greater product speeds than attainable by prior art, laminar flow, inerting techniques.

The requisite relative velocity between the inert gas flow and moving product surface may be established in different manners depending upon the speed of the moving product surface. This surface may be either an upper or lower product surface. At relatively high product speeds, i.e., 1,000 ft. per minute or greater, a relatively low velocity inert gas stream may be passed countercurrent to the moving product such that the resultant relative velocity easily establishes a turbulent condition in the boundary layer of air dragged into the tunnel by the moving product surface. In processes wherein the moving product is translated at substantially lower speeds, the requisite relative velocity may be established by introducing a high velocity cross flow of inert gas in a plane substantially parallel to the plane of the moving product surface. The resultant relative velocity between the introduced inert gas stream and the moving product surface will be effective to establish the necessary turbulent condition mentioned heretofore and thus assure the rapid diffusion of atmospheric oxygen away from the moving product surface. In addition, the magnitude of the inert gas flow must be sufficient to assure that the oxygen concentration at the tunnel entrance is 20.8% or less to assure diffusion of oxygen upwardly from the product surface. Although a complete treatment system may include a treatment chamber disposed between entrance and exit tunnels, it is within the scope of the present invention to divide an incoming inert gas flow such that a portion thereof actually flows in a co-current manner with respect to the moving product surface to thereby balance inert gas-surface drag forces and thereby minimize the loss of inert gas as well as prevent the introduction of air into the system through the exit tunnel. In addition, various other gas flows may be utilized to establish a pressure gradient in the direction of movement of the product surface thereby promoting the retention of inert gas within the treatment system notwithstanding the tendency of a moving product surface to drag the inert gas out of the system.

BRIEF DESCRIPTION OF THE DRAWING

The invention will be more clearly understood by reference to the following description of exemplary embodiments thereof in conjunction with the following drawing in which:

FIG. 1 is a partial elevational view of a treatment system through which a product surface is translated and an inert gas flow is established in accordance with the present invention;

FIGS. 1A and 1B is a graphical representation of the oxygen concentration at various positions along the entrance tunnel of a typical treatment system;

FIGS. 1C and 1D is a diagrammatic view of velocity profiles of laminar and turbulent inert gas flow through a typical tunnel;

FIGS. 2A and 2B is a partial isometric view of a tunnel and moving product surface together with the relationship between inert gas and relatively high product velocities in accordance with the present invention;

DESCRIPTION OF PREFERRED EMBODIMENTS

Figure 3A:
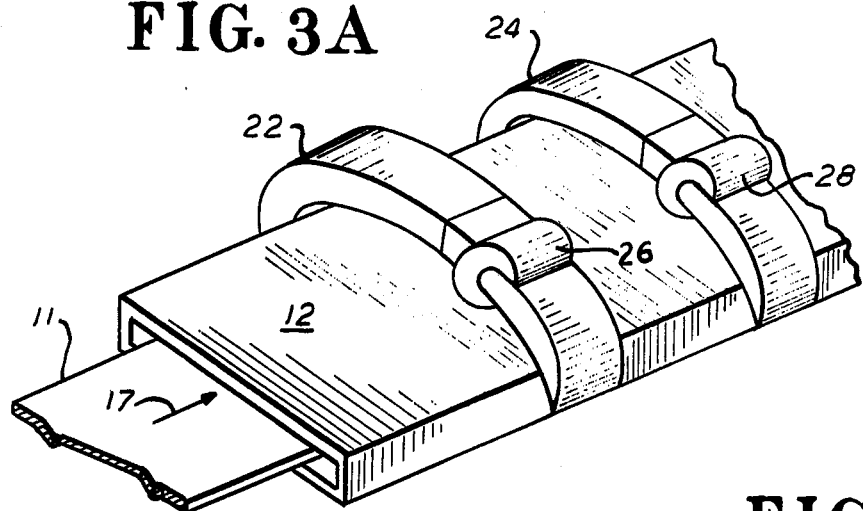
FIG. 3A is a partial isometric view of an exemplary embodiment of apparatus for performing the method according to the present invention wherein a product is translated at a relatively low speed.

Referring now to FIG. 1, illustrated therein is an exemplary embodiment of treatment apparatus 10 which includes an entrance tunnel 12 and a treatment chamber 14 through which a moving product 11 is translated, preferably in the direction of arrow 17. An inert gas flow, which may comprise a stream of nitrogen, carbon dioxide, argon, etc., is introduced into apparatus 10 and may have a component in the direction of arrow 13. As those skilled in the art will appreciate, treatment chamber 14, which may comprise a radiation chamber in a curing system may be provided with a radiation source 18, such as an ultraviolet or electron beam generating device and a radiation direction means 20, which may comprise a reflector or the like which is commonly used in connection with such curing systems. Although tunnel 12 is illustrated in FIG. 1 as having a height substantially greater than the height of moving product 11, it will be appreciated that in practice, the height of tunnel 12 is only great enough to enable a sufficient clearance to exist above product 11 and may be increased if necessary to obtain turbulent conditions in the inert gas flow therethrough at particular flow velocities as will be subsequently described. Moving product 11 may be provided with an upper, planar surface and may comprise a continuous web material bearing a resin coating or ink to be cured, for example, in treatment chamber 14. Alternately, product 11 may take the form of a discrete panel or the like which is to undergo a particular, desired treatment within chamber 14 and under an inert atmosphere therein. Furthermore, product 11 may have a curvilinear surface which should be relatively smooth and continuous. Typically, boundary layer B will extend from the upper surface of product 11 to the top of tunnel 12 although the height of this layer in tunnel 12 or chamber 14, etc. will vary in accordance with the speed at which product 11 is translated.

In the method and apparatus according to the present invention, product 11 is translated through treatment apparatus 10 at a particular speed the value of which will determine the throughput of such apparatus. It has been found in practice that a certain residence time in chamber 14 is required in order to treat the upper surface of product 11, i.e., the curing of resins on a web material by exposure to radiation emitted by source 18. It has been found that the factor which most severely limits increased throughput rates obtainable from apparatus 10 has been the inability to adequately inert the atmosphere above product 11 within an entrance tunnel 12 without requiring excessive quantities, i.e., flow rates, consumption, etc. of inert gas. For example, previous treatment systems have been limited to throughput rates in which a moving product surface is translated at a speed of less than 1,000 ft. per minute and it is to improving this particular parameter of treatment apparatus such as curing systems to which the present invention is directed. As mentioned heretofore, as a consequence of product 11 being translated into entrance tunnel 12, air is dragged in as a boundary layer B on the surface of product 11. It is well known that the height or extent of such boundary layer is related to the velocity or speed of product 11 and accordingly, the greater the speed thereof, the more air, and hence oxygen is dragged into tunnel 12. It is the oxygen introduced into tunnel 12 in the form of a boundary layer of air that must be removed prior to passage of the immediately adjacent portion of product 11 into a treatment chamber. Thus, at relatively high speeds of product translation, e.g. 1,000 ft. per minute and greater, oxygen must be removed from the boundary layer B immediately adjacent the surface of product 11 at a rapid rate if entrance tunnel 12 is to be of any acceptable length. It has been found that by providing a flow of inert gas which may have a component in the direction indicated by arrow 13, and thereby establishing a relative velocity between the inert gas flow and the surface of product 11 of at least 900 ft. per minute, boundary layer B will be rendered turbulent. This will result in the rapid diffusion of oxygen in boundary layer B away from the surface of product 11 upwardly in tunnel 12. The magnitude of this inert gas flow is established so that the concentration of oxygen immediately inside the entrance of tunnel 12 is maintained at a value less than 20.8% (the percentage of oxygen in atmospheric air) and this actual oxygen concentration may be measured by any suitable measuring device (not shown). Accordingly, by maintaining such an inert gas flow at a velocity such that the relative velocity between the inert gas flow and the surface of product 11 is sufficient to assure the presence of turbulence in the boundary layer attached to the surface of product 11 (generally a relative velocity of 900 ft. per minute), oxygen will be diffused from the product surface, as opposed to being stripped away from this surface upwardly into the essentially inert upper reaches of tunnel 12. It will be appreciated that although the inert gas flow is indicated to have at least a component countercurrent to the direction of product translation, the inert gas flow may be in any direction on a plane parallel to the moving product surface as long as the foregoing relative velocity sufficient to generate turbulent conditions is established. However, a countercurrent inert gas flow may be beneficial in balancing drag forces as will be subsequently described.

As indicated in FIGS. 1A and 1B, the oxygen concentration in the essentially inert upper reaches of the boundary layer at any point along the length of tunnel 12 in the direction toward chamber 14 is less than the concentration of oxygen in the boundary layer immediately therebelow. It is this difference in oxygen level which enables the diffusion of oxygen away from the product surface upwardly into the boundary layer to thereby inert the atmosphere immediately above the product surface. Additionally, the rate of oxygen diffusion is such that extremely low and virtually insignificant oxygen concentrations will exist at the surface of product 11 as this product reaches the entrance to treatment chamber 14 to permit treatment therein in an essentially inert atmosphere. Furthermore, by utilizing a mechanism of diffusion for removing oxygen from the aforementioned boundary layer into an inert gas flow, it has been found that oxygen removal is sufficiently rapid so that acceptable tunnel lengths (12–18 inches) may be utilized and still enable passage of product 11 through treatment apparatus 10 at velocities of 1,000 ft. per minute and greater. Thus, the method according to the present invention is effective to remove the following constraints inherent with prior art treatment systems, namely that throughput rates are limited by the requirement of laminar boundary layer conditions, and hence low product speeds, to attain acceptable inert gas consumption rates. It is this deficiency of prior art systems which is remedied upon practice of the method according to the present invention. In this manner, an improved throughput may be obtained from utilization of conventional treatment systems by assuring the presence of turbulence in the boundary layer of air dragged into the entrance tunnel thereof by the moving product.

A further benefit which accrues from the method and apparatus according to the present invention is related to the distinction between turbulent and laminar flow in entrance tunnel 12. By establishing a turbulent condition in the boundary layer as mentioned above, the velocity profile of the inert gas flow will be substantially uniform throughout the entire cross section of tunnel 12 as indicated by the horizontal arrows shown in FIG. 1D. However, in the event that laminar flow conditions are established as is the case with prior art inerting systems, the resultant velocity profile illustrated by the horizontal arrows depicted in FIG. 1C will result in air being dragged into the entrance tunnel immediately adjacent the surface of product 11 as illustrated by the lowermost horizontal arrow of FIG. 1C. Accordingly, even at low product speeds where laminar flow can be maintained, atmospheric oxygen is more effectively precluded from being dragged into entrance tunnel 12 as a consequence of establishing turbulent conditions in the boundary layer in accordance with the present invention.

As mentioned previously, the method and apparatus according to the present invention enables the inerting of moving product surfaces at velocities of 1,000 ft. per minute and greater. Referring now to FIG. 2A, there is illustrated a portion of entrance tunnel 12 and a portion of product 11 which, is preferably translated at a speed of 1,000 ft. per minute or greater in the direction of arrow 17. As translation of product 11 at this relatively high speed introduces more air into tunnel 12 in the boundary layer attached to the product surface than at lower product speeds, a greater flow (cu.ft./hr.) of inert gas is required in the direction of arrow 13 in order to assure that the concentration of oxygen immediately inside the entrance to tunnel 12 is maintained at a value of less than 20.8%. However, although the total inert gas flow will be somewhat increased in order to provide the aforementioned inerting of entrance tunnel 12 and thus enable treatment of product 11 within a suitable chamber 14 (FIG. 1), it will be realized that a lower inert gas velocity will be required in order to generate a sufficient relative velocity between the inert gas and the surface of moving product 11 for production of turbulence in the boundary layer attached thereto. Accordingly, the requirement of maintaining oxygen concentration below 20.8% at the inlet of tunnel, which can be achieved with relatively low flows is determinative of inert gas required when product 11 is translated at speeds of 1,000 ft. per minute or greater. For a tunnel 12 of a constant cross-section, lower inert gas velocities result in lower inert gas flows which reduces the cost of such gas and serves to render economical the process according to the present invention.

Furthermore, it is possible to establish either a laminar or turbulent condition in boundary layers at a single relative velocity, such as 900–1000 ft. per minute depending upon the extent of the clearance or spacing between the surface of product 11 and the roof or upper portion of tunnel 12. By increasing this spacing, turbulence may be caused to occur in the boundary layer at a somewhat lower velocity than would be possible with a minimum spacing or clearance. This would result in a lower inert gas velocity being required to create a turbulent boundary layer for a given product velocity and consequently enables a reduction in the flow and thus consumption of inert gas.

Figure 3B:
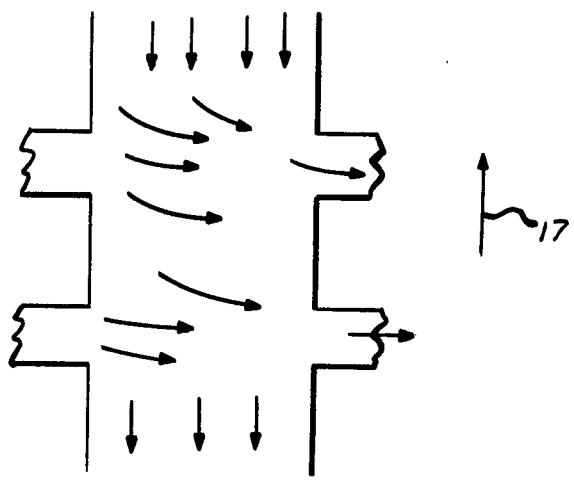
FIG. 3B is a diagrammatic representation of the inert gas flow across a moving product surface as illustrated in FIG. 3A.

In treatment processes wherein product 11 is not required to be translated at the foregoing high speeds, effective inerting of tunnel atmospheres above the product surface can also be effected by the method according to the present invention. Referring now to FIG. 3A, illustrated therein is an exemplary embodiment of a portion of entrance tunnel 12 through which product 11 is translated along the direction of arrow 17. In addition, suitable ducts 22 and 24, etc. are provided with fans or blowers 26, 28, etc. disposed therein establishing a cross flow of inert gas at relatively high velocities, such as 900 ft. per minute, within tunnel 12. A typical flow pattern of such high velocity, inert gases is illustrated in FIG. 3B. It will be understood that in view of the lower velocity of moving product 11, a lower flow of inert gas countercurrent to the moving product will be required in order to limit the concentration of oxygen in the inert gas flow immediately inside the entrance to tunnel 12 to less than 20.8%. However, although such lower inert gas flows serve to reduce inert gas consumption, the requirement for establishing a high (e.g. 900 ft. per minute) relative velocity between the inert gas flow and the speed of the translated product, in a plane parallel to the product surface, remains. It will be appreciated that in the event the velocity of the inert gas flow in a direction opposite to that of product movement is above an optimum value, substantial quantities of inert gas will be lost by virtue of flowing out of the entrance of tunnel 12. This, of course, would result in a relatively inefficient utilization of the inert gas flow although the appropriate resultant relative velocity necessary for establishing turbulence could, of course, be generated in this manner. In accordance with the present invention, it is proposed to supply an essentially cross flow of high velocity inert gas through ducts 22, 24, etc., thereby establishing a resultant velocity in a plane parallel to the surface of product 11 with the relative velocity between the resultant inert gas velocity and the velocity of product 11 being of a magnitude sufficient to assure the presence of a turbulent boundary layer of air dragged into tunnel 12 by moving product 11. The resultant velocity will have a component in a direction opposite to the direction of product translation. Accordingly, the apparatus illustrated in FIG. 3A and operation thereof are effective to inert atmospheres above product surfaces being translated at speeds of less than, for example, 900–1,000 ft. per minute.

Figure 4:
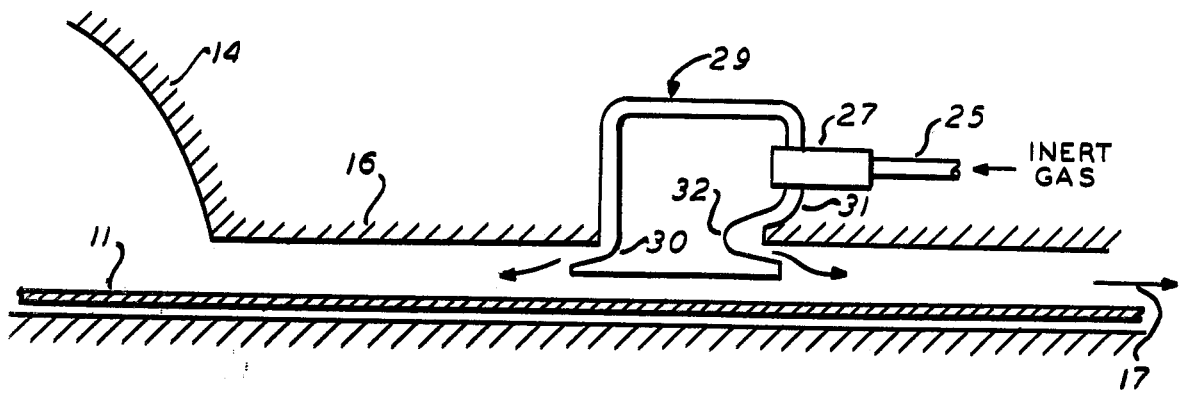
FIG. 4 is a partial elevational view of an exemplary embodiment of apparatus in accordance with the present invention wherein inert gas streams are introduced into the exit tunnel of a typical treatment system.

In addition to the aforedescribed inerting of the atmosphere above a moving product surface by establishing a turbulent condition in the boundary layer of air dragged into a tunnel and the rapid diffusion of oxygen away from the product surface into the boundary layer, it is within the scope of the present invention to control the introduction of inert gas in such a manner that losses thereof through the entrance and exit tunnels of a typical treatment system are minimized. In order to effect such reductions in losses of inert gas, it is desirable to establish an approximate balance between various drag forces operating internally of the treatment system. For example, by translating a product at a relatively high velocity such as 1,000 ft. per second or greater, substantial quantities of inert gas will be dragged outwardly of the apparatus through the exit tunnel 16 which is illustrated in FIG. 4. This loss of inert gas may be substantially reduced by passing a flow of inert gas countercurrent to the moving product as will now be described in a further exemplary embodiment of the present invention.

As illustrated in FIG. 4, inert gas may be supplied through conduit 25 to flow dividing valve 27 the adjustment of which will determine the flow of inert gas through conduits 29 and 31 and the flow through associated orifices 30 and 32 in upstream and downstream directions, respectively. Accordingly, by introducing a relatively high velocity flow in a direction toward chamber 14 as illustrated in FIG. 4, for the purpose of inerting the atmosphere in chamber 14 and in an entrance tunnel (not shown) as mentioned above, the quantity of inert gas which would otherwise be swept from exit tunnel 16 by motion of product 11, is substantially reduced. However, as inert gas may be discharged through orifice 30 at 1,000 ft. per minute and greater, such a high velocity flow may actually drag air into exit tunnel 16. Therefore, it is desired to establish a minor flow of inert gas through conduit 31 and orifice 32 in essentially the same direction as motion of product 11 to preclude entry of air into tunnel 16. In this manner, although a relatively low flow of inert gas is discharged from exit tunnel 16, substantial quantities thereof which would otherwise be swept from tunnel 16 are retained therein while the entry of atmospheric oxygen into tunnel 16 is also substantially precluded. In addition, the use of a flow divider 27 as illustrated in an exemplary manner in FIG. 4 enables the establishment of inert gas flows through orifices 30 and 32 which can be utilized to adjust or balance the momentum of inert gas flows within tunnel 16 and develop thereby a substantially balanced relationship between drag forces generated by the motion of product 11 and the flow of inert gas supplied to the treatment apparatus. This aspect of the present invention will be discussed in greater detail in connection with the structure illustrated in FIG. 7.

Figure 5:
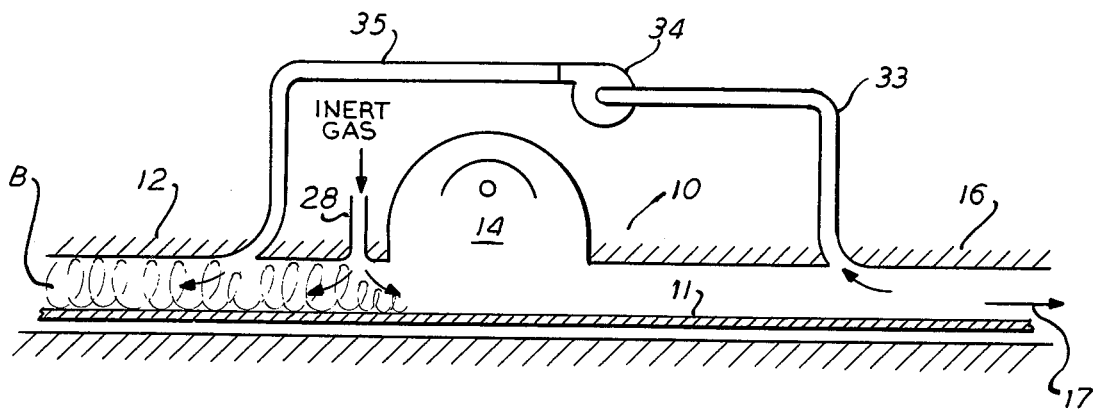
FIGS. 5–7 are partial elevational views of exemplary embodiments of treatment systems wherein the method according to the present invention may be performed.

Referring now to FIG. 5, illustrated therein is an exemplary embodiment of apparatus for effecting a momentum balance between gas-product drag forces and thereby reduce the quantity of inert gas swept from apparatus 10 by motion of product 11 therethrough. A suitable flow of inert gas is established through conduit 28 and will be effective as described heretofore in establishing a turbulent condition in the boundary layer B of air dragged into entrance tunnel 12 by translation of product 11 in the direction of arrow 17. In addition, a conduit 33 is adapted to communicate with exit tunnel 16 and the inlet of a compressor or blower 34, the outlet of which is connected to conduit 35 for the eventual discharge of inert gas into entrance tunnel 12. Preferably conduit 35 is arranged so that the inert gas discharged therefrom will have at least a component in a direction opposite to that of the moving product 11. It will be seen that by injecting a relatively high velocity flow of inert gas by means of conduits 33, 35 and by blower 34, inert gas which would otherwise be dragged out of exit tunnel 16 is returned to entrance tunnel 12 as a portion of the total flow required to inert the atmosphere above product 11 as this product is translated therethrough. In this manner, the quantity of inert gas swept from exit tunnel 16 is reduced.

Figure 6:
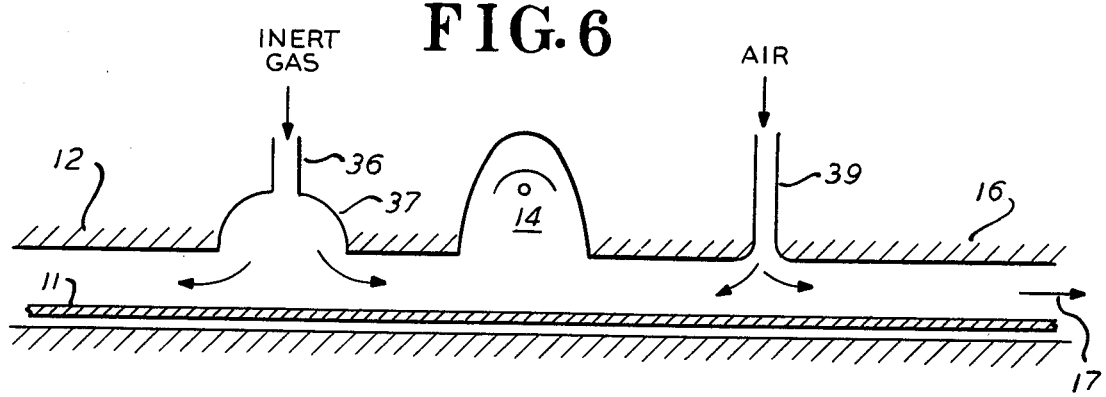

FIG. 6 depicts a further embodiment of the present invention. A relatively low pressure flow of inert gas is passed through conduit 36 and chamber 37 which is disposed to discharge such inert gas flow into entrance tunnel 12. A suitable source of a high pressure gas, which may comprise air, is placed in communication through conduit 39 with the exit tunnel 16. Thus, the flow of inert gas which is swept toward tunnel 16 by drag forces existing between such inert gases and the surface of the moving product 11, is reduced as a consequence of encountering the pressure gradient established by the combination of a low pressure inert gas flow discharged from chamber 37 and a high pressure air flow discharged into exit tunnel 16.

Figure 7:
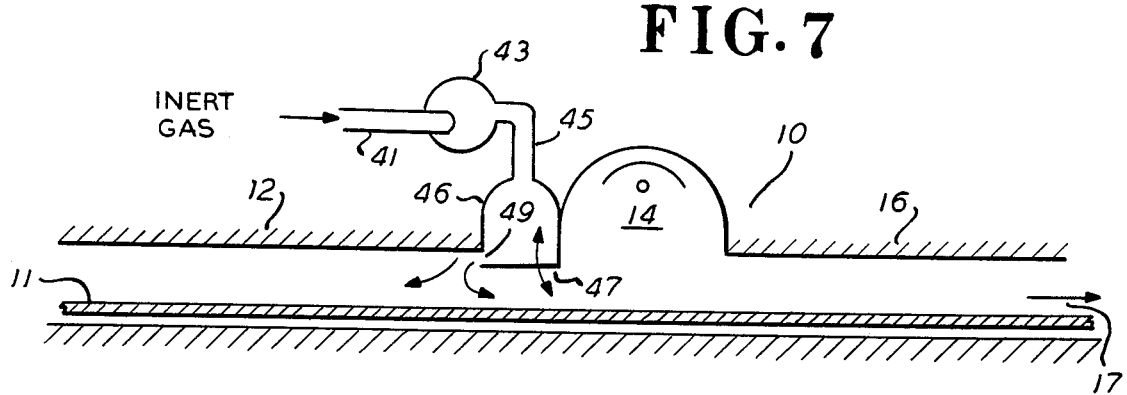

Referring now to FIG. 7 illustrated therein is a further embodiment of the present invention wherein apparatus is provided for discharging a controlled velocity, inert gas flow into treatment apparatus 10 to enable the drag forces between inert gas and moving product 11 to be balanced and thereby reduce the losses of such inert gas. More particularly, inert gas is supplied through conduit 41 to a blower or compressor 43 which in turn is connected through conduit 45 to an expansion chamber 46. The outlet or orifice 49 of chamber 46 may be adjustably controlled by virtue of a movable member such as 47 which may comprise any known device for controlling the velocity of a gas discharged from such a chamber 46. The momentum of the inert gas discharged from outlet or orifice 49 will counteract the drag forces exerted by the interaction of the inert gas with the surface of product 11 moving at relatively high speeds. In the event that orifice 49 is adjusted by operation of member 47 to a relatively small opening, the gas injection speed will be extremely high and rather than losing inert gas from exit tunnel 16, air will actually be dragged or sucked into the exit tunnel 16. Conversely, if the opening of outlet 49 is relatively large, the inert gas flow discharged therethrough will be of a low velocity and will be essentially dragged outwardly of exit tunnel 16 with air being dragged into entrance tunnel 12. It will be understood that this inverse relationship between orifice opening and gas velocity is effected upon discharge of gas through the orifice at a substantially constant mass flow rate. As will be appreciated, it is necessary to adjust the opening of outlet 49 such that a proper inert gas flow will be introduced into apparatus 10 such that drag forces internally of the apparatus will be balanced and yet the quantity of inert gas lost through entrance and exit tunnels 12 and 16, respectively, will be minimized. This requirement to balance internal gas-surface drag forces, as mentioned previously, is particularly important when product 11 is translated at speeds of 1,000 ft. per minute or more.

In treatment systems wherein a product speed is sufficient to generate a boundary layer sufficient to virtually fill a tunnel, the particular drag forces which are to be balanced in treatment apparatus 10 comprise a first drag force $F_1$ which will constitute a minor drag force at the upper boundary of entrance tunnel 16 and will operate in the same direction as motion of product 17. The force indicated by arrow $F_2$ will be representative of the force or momentum of gas discharged through outlet 49 and will in effect be set to balance other drag forces which will now be described. The drag force indicated by the arrow $F_3$ may represent the drag force on the gas leaving through exit tunnel 16 while the drag force indicated by arrow $F_4$ will represent the interaction of an inert gas with the surface of moving product 11. Finally, force $F_5$ will represent a similar but somewhat smaller drag force resulting from the interaction of inert gas on product 11 in exit tunnel 16. Accordingly, by adjusting the opening of orifice or outlet 49, the velocity and hence momentum or force of the inert gas discharged from chamber 46 into apparatus 10 (force $F_2$) will be effective to balance the other drag forces $F_1$, $F_3$, $F_4$ and $F_5$ such that a minimum flow of inert gas is lost from apparatus 10 during treatment of moving product 11.

The foregoing and other various changes in form and details may be made without departing from the spirit and scope of the present invention. Consequently, it is intended that the appended claims be interpreted as including all such changes and modifications.

What is claimed is:

1. A method of inerting the atmosphere adjacent a surface of a product including translating the product into and through a tunnel thereby dragging air into the tunnel in a boundary layer extending away from said surface and introducing an inert gas flow into said tunnel, the improvement comprising introducing said inert gas (1) at a flow rate sufficient to limit the oxygen concentration immediately inside the inlet of said tunnel to less than 20.8% and (2) with a magnitude and direction of momentum sufficient to substantially balance drag forces between said inert gas flow and said translated product and between said inert gas flow and tunnel walls to reduce the loss of inert gas from said tunnel; and establishing a relative velocity between said inert gas flow and said translated product surface sufficient to render said boundary layer essentially turbulent such that atmospheric oxygen dragged into said tunnel by said translated product is rapidly diffused away from said product surface into said boundary layer.

2. A method as defined in claim 1 wherein said product is translated at a velocity of at least 1000 ft./min. and said inert gas is introduced into said tunnel in a direction substantially opposite to the direction of said product translation with the velocity of said inert gas in said tunnel being less than 300 ft./min. such that the relative velocity between said translated product and said inert gas flow in said tunnel is effective to establish said turbulent condition in said boundary layer.

3. A method as defined in claim 1 wherein said product is translated from said tunnel sequentially through an irradiation chamber and an exit tunnel, said step of introducing inert gas into said tunnel being effective to substantially inert the atmosphere in said exit tunnel, said chamber and said tunnel, and additionally comprising the steps of withdrawing inert gas from said exit tunnel and returning said withdrawn inert gas from said exit tunnel to said entrance tunnel thereby reducing the flow of inert gas dragged outwardly of said exit tunnel by said translated product surface.

4. Apparatus for inerting the atmosphere adjacent a moving product surface including a tunnel having an inlet, outlet and internal walls, and means for translating said product surface through said tunnel, the improvement comprising variable orifice means for introducing an inert gas flow into said tunnel at a substantially constant mass flow rate sufficient to limit oxygen concentration immediately inside the inlet of said tunnel to less than 20.8% with a momentum having a magnitude and direction sufficient to substantially balance drag forces between (1) said inert gas flow and said translated product surface and (2) said inert gas flow and said tunnel walls to reduce the loss of inert gas from said tunnel, and said inert gas flow having a velocity relative to the velocity of said translated product surface sufficient to render the boundary layer of air dragged into said tunnel by said translated product surface turbulent whereby atmospheric oxygen is rapidly diffused away from said product surface into said boundary layer.

5. A method of inerting the atmosphere adjacent a surface of a product in a tunnel comprising the steps of translating said product through said tunnel thereby dragging air into the tunnel in a boundary layer extending away from said surface; introducing an inert gas flow into said tunnel at a rate sufficient to substantially inert the atmosphere therein; withdrawing gas from said tunnel; increasing the pressure of said withdrawn gas; and returning said withdrawn gas of increased pressure into said tunnel at a velocity relative to the velocity of said translated product such that said boundary layer is rendered turbulent and oxygen dragged into said tunnel by said translated product is diffused away from said product surface into said boundary layer.

6. A method of inerting the atmosphere adjacent a surface of a product comprising the steps of translating the product sequentially through an entrance tunnel, an irradiation chamber and exit tunnel; introducing a first stream of inert gas into said exit tunnel in a direction substantially opposed to the direction of product translation at a velocity relative to the velocity at which said product is translated sufficient to render the boundary layer of atmospheric air dragged into the entrance tunnel turbulent such that oxygen in such boundary layer is diffused away from said product surface; introducing a second stream into said exit tunnel substantially in the direction of product translation with the total flow rate of said first and second inert gas streams being sufficient to substantially inert the exit tunnel, irradiation chamber and entrance tunnel; and adjusting the momentum of said first and second inert gas streams such that drag forces between said inert gas streams and tunnel walls and between said inert gas streams and said translated productsurface are substantially balanced thereby minimizing the loss of inert gas from said entrance and exit tunnels.

7. Apparatus for inerting the atmosphere adjacent a moving product surface being translated through a tunnel including means for introducting an inert gas flow into said tunnel to substantially inert the atmosphere therein, the improvement comprising first duct means in communication with said tunnel at a location intermediate the entrance and exit thereof, fan means disposed to withdraw gas from said tunnel through said first duct means and for increasing the pressure of said withdrawn gas and second duct means for receiving gas of increased pressure from said fan means and having an outlet for discharging said gas of increased pressure into said tunnel at a velocity relative to the velocity of said moving product surface such that the boundary layer of air dragged into said tunnel by said moving product surface is rendered turbulent whereby atmospheric oxygen is diffused away from said surface into said boundary layer.

* * * * *